United States Patent Office 2,784,191
Patented Mar. 5, 1957

2,784,191
PROCESS FOR THE PRODUCTION OF LACTAMS

Kurt Fischer, Altoetting, Oberbayern, and Hans Oberrauch, Burghausen an der Salzach, Germany, assignors to Farbwerke Hoechst Aktiengesellschaft vormals Meister Lucius & Bruning, Frankfurt am Main Hoechst, Germany, a German company No Drawing. Application March 1, 1954,
Serial No. 413,432

Claims priority, application Germany March 3, 1953

4 Claims. (Cl. 260—294.7)

The present invention relates to a process for the production of lactams. More particularly it concerns such a proces in which the lactams are formed from ω-halogen substituted fatty acids and amonium hydroxide.

Lactams have heretofore been produced either by a Beckmann re-arrangement of cyclic oximes or by the reaction of dicarboxylic acids with ammonia and hydrogen at elevated temperature in the vapor phase and in the presence of catalysts. It has also been suggested to prepare them by conversion of lactones with liquid ammonia under pressure, or by hydrogenation of γ- or δ-keto acids in the presence of ammonia, or finally from amino acids.

We have now found that one may prepare lactams very simply and with excellent yields by reacting an ω-halogen substituted fatty acid with an excess of concentrated ammonium hydroxide at elevated temperatures under autogenous pressure, i. e. the pressure formed when the reactants are maintained in a closed vessel. It is generally preferred to carry out the reaction at temperatures between about 200 and about 350° C., while the best results may be obtained between about 250 and about 300° C. The lactams formed may be recovered from the reaction mixture by extraction with a suitable organic solvent and can be purified by vacuum distillation after removal of the solvent. The course of the reaction may be represented by the following equation:

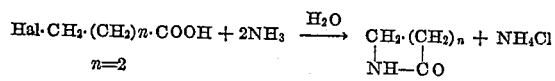

wherein $n$ equals three or a greater whole number, i. e. the process is applied to ω-halogen substituted fatty acids having a total of at least four carbon atoms in the chain.

The primary advantage of our new method described above is that one need not first prepare the lactone from the ω-halogen substituted compound and then convert such lactone to lactam with liquid ammonia under pressure in a subsequent step, but rather one is able to convert the ω-halogen substituted compound directly to the lactam by means of the ammonium hydroxide in a single step. Thus the production of the lactams is greatly simplified and better yields may be obtained.

Our process may be carried out in a closed autoclave, or preferably it may be conducted in a continuous manner by passing the ammoniacal solution of the ω-halogen substituted fatty acid through a reaction zone maintained at the desired temperature under autogenous pressure, whereby the time of stay in the reaction zone is so adjusted that the highest possible conversion, i. e. an optimum yield of lactam is obtained.

Generally speaking, we prefer to employ as starting material ω-chlorine or bromine substitute fatty acids containing from four to about seven carbon atoms in the chain. The concentrations of the aqueous ammonium hydroxide solution may vary widely, but best results have been obtained with concentrations of from about 20 to about 34%. While extraction of the lactams with organic solvents such as chloroform is preferred, other methods for recovering the lactam from the reaction mixture will be apparent to those skilled in the art. Our method represents a particularly favorable way for producing such lactams as valerolactam, caprolactam and the like, which have become important initial materials for chemical reactions, so that their simpler and more economic production is of special importance.

The following examples will serve to illustrate our invention, but such invention is, of course, not limited to the details given therein.

Example 1

1000 cc. of a 23% ammonium hydroxide solution and 136.5 g. of ω-chlorvaleric acid are heated together in a five liter, high pressure autoclave at 275° C. for 18 hours, whereby a pressure of about 140 atmospheres is developed. After cooling, the contents of the autoclave are extracted with chloroform in a suitable extraction apparatus. The solvent is then removed, and the residue is vacuum distilled at a pressure of 14 mm. whereby one obtains 89.8 g. of δ-valerolactam boiling at 137° C., which becomes solid on cooling. The yield thus amounts to 90.5% of the theoretical yield.

Example 2

10 g. of ω-chlorbutyric acid and 82 cc. of a 23% ammonium hydroxide solution are heated in a high pressure autoclave for 18 hours at 275° C. After cooling, the contents of the autoclave are extracted with chloroform which is then evaporated leaving a residue from which 4.9 g. of pyrrolidone-(2) are obtained by vacuum distillation. The yield amounts to about 70% of theory.

We claim:

1. A process for the preparation of lactams, which comprises reacting a member of the group consisting of ω-chlorine and ω-bromine substituted fatty acid containing from 4 to 7 carbon atoms in the chain with ammonium hydroxide at elevated temperatures and pressures, and recovering the lactam thus formed from the reaction mixture.

2. A process as claimed in claim 1, wherein the reaction is performed at between about 200 and 350° C. under autogenous pressure.

3. A process as claimed in claim 2, wherein an aqueous ammonium hydroxide solution having a concentration between about 20% and about 34% is used.

4. A process as claimed in claim 1, wherein the lactam is recovered from the reaction mixture by extraction with an organic solvent and subsequently purified by vacuum distillation.

References Cited in the file of this patent

Gansser: Hoppe-Seyler Zeitschrift fur Physiologische Chemie, vol. 61, p. 58, abstracted in Beilstein's Handbook of Org. Chem., vol. 21, p. 237, Springer ed. (1935).

Emmert et al.: Berichte des deutsche chemischen Gesselschaft, vol. 54, p. 212, abstracted in Beilstein's Handbook, vol. 21, 2nd supplement, p. 216 (1953).